(12) United States Patent
Goggins (10) Patent No.: US 6,424,467 B1
(45) Date of Patent: Jul. 23, 2002

(54) HIGH DEFINITION LENTICULAR LENS (75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

(21) Appl. No.: 09/816,435

(22) Filed: Mar. 23, 2001

Related U.S. Application Data
(60) Provisional application No. 60/230,587, filed on Sep. 5, 2000.

(51) Int. Cl.$^7$ .............................................. G02B 27/10
(52) U.S. Cl. ...................................... 359/626; 359/619
(58) Field of Search ................................ 359/619, 620, 359/626

(56) References Cited

U.S. PATENT DOCUMENTS

| 4,414,316 A | 11/1983 | Conley | 430/496 |
|---|---|---|---|
| 4,420,502 A | 12/1983 | Conley | 427/54.1 |
| 4,420,527 A | 12/1983 | Conley | 428/172 |
| 5,113,213 A | 5/1992 | Sandor et al. | 355/22 |
| 5,266,995 A | 11/1993 | Quadracci et al. | 355/22 |
| 5,362,351 A | 11/1994 | Karszes | 156/243 |
| RE35,029 E | 8/1995 | Sandor et al. | 355/22 |
| 5,457,515 A | 10/1995 | Quadracci et al. | 355/132 |
| 5,488,451 A | 1/1996 | Goggins | 355/77 |
| 5,617,178 A | 4/1997 | Goggins | 355/22 |
| 5,847,808 A | 12/1998 | Goggins | 355/22 |
| 5,896,230 A | 4/1999 | Goggins | 359/619 |
| 6,060,003 A | 5/2000 | Karszes | 264/1.34 |
| 6,074,192 A | 6/2000 | Mikkelsen | 425/327 |

Primary Examiner—Ricky Mack
(74) Attorney, Agent, or Firm—Whyte Hirschboeck Dudek SC (57) ABSTRACT Disclosed herein is a high definition lenticular lens and a high definition lenticular image. The high definition lenticular lens can comprise a front surface having a plurality of lenticules and a substantially flat back surface opposite the front surface. Each lenticule has characteristic parameters that include a focal length, an arc angle, and a width. The arc angle is greater than about 90 degrees and the width is less than about 0.0067 inches. The lens has a gauge thickness that is equal to or substantially equal to the focal length. The high definition lenticular image comprises a precursor image joined to the high definition lenticular lens.

46 Claims, 9 Drawing Sheets

| Focal Length | f | Cresent Depth | c | Lens Base | b | Lens Width | w | Radius | r | Arc Angle | a | Index of Ref. |
|---|---|---|---|---|---|---|---|---|---|---|---|---|
| .0073 | $f_2$ | .0012226 | $c_2$ | .0061062 | $b_2$ | .0049584 | $w_2$ | .003125 | $r_1$ | 105 | $a_2$ | 1.56 |

| Focal Length | f | Cresent Depth | c | Lens Base | b | Lens Width | w | Radius | r | Arc Angle | a | Index of Ref. |
|---|---|---|---|---|---|---|---|---|---|---|---|---|
| .0077 | $f_4$ | .0010265 | $c_4$ | .0067317 | $b_4$ | .0049568 | $w_4$ | .003505 | $r_2$ | 90 | $a_1$ | 1.56 |

| Focal Length | f | Cresent Depth | c | Lens Base | b | Lens Width | w | Radius | r | Arc Angle | a | Index of Ref. |
|---|---|---|---|---|---|---|---|---|---|---|---|---|
| .0071 | $f_5$ | .0014315 | $c_5$ | .0056819 | $b_5$ | .0049588 | $w_4$ | .002863 | $r_3$ | 120 | $a_3$ | 1.56 |

| Focal Length | f | Cresent Depth | c | Lens Base | b | Lens Width | w | Radius | r | Arc Angle | a | Index of Ref. |
|---|---|---|---|---|---|---|---|---|---|---|---|---|
| .0069 | $f_1$ | .0009152 | $c_1$ | .0060019 | $b_1$ | .0044194 | $w_1$ | .003125 | $r_1$ | 90 | $a_1$ | 1.56 |

| Focal Length | f | Cresent Depth | c | Lens Base | b | Lens Width | w | Radius | r | Arc Angle | a | Index of Ref. |
|---|---|---|---|---|---|---|---|---|---|---|---|---|
| .0077 | $f_3$ | .0015625 | $c_3$ | .0062019 | $b_3$ | .0054126 | $w_5$ | .003125 | $r_1$ | 120 | $a_3$ | 1.56 |

HIGH DEFINITION LENTICULAR LENS

CROSS-REFERENCE TO RELATED APPLICATION

This application claims the benefit of U.S. Provisional Application No. 60/230,587 filed Sep. 5, 2000.

FIELD AND BACKGROUND OF THE INVENTION

The present invention generally relates to lenticular lenses. In one aspect, the invention relates to high definition lenticular lenses. In another aspect, the invention relates to high definition lenticular images.

Lenticular lenses take the form of a transparent plastic sheet or web, and the sheet typically includes an array of identical curved or ribbed surfaces that are formed (e.g., cast, coated, embossed, extruded, or co-extruded) on the front surface of the plastic sheet. The back surface of the lens is typically flat. Each lenticule or individual lens is typically a section of a long cylinder that focuses on, and extends over, substantially the full length of an underlying image. Other lens shapes or profiles are possible (for instance, pyramidal, trapezoidal, parabolic, and the like). The lenticular lens is generally selected to accommodate both the underlying image and the distance from which the image will ordinarily be viewed. Lenticular lenses and their technology are well-known and commercially available. Methods for using lenticular lens technology are described in detail in U.S. Pat. Nos. 5,113,213 and 5,266,995, the disclosures of which are incorporated here by reference.

A lenticular image comprises an underlying precursor image that has been applied to a lenticular lens in any of a variety of alternative ways (described further below). The preparation of the precursor image is well known in the art. The precursor image is a composite of two or more component images that are themselves preferably of photographic quality. The component images are selected based upon the desired features of the lenticular or final image. The component images are then arranged, segmented, interlaced and mapped to create the precursor image so that the precursor image (or simply "image") corresponds with the lenticular lens in any convenient manner, e.g., such as those taught in U.S. Pat. Nos. 5,488,451, 5,617,178, 5,847,808 and 5,896,230, the disclosures of which are incorporated here by reference.

In the past, to perceive the desired visual effect (e.g., motion and/or depth), the image was typically printed to a substrate (e.g., paper, plastic, metal, glass or wood). Then the substrate was usually laminated to the lenticular lens (i.e, thereby creating the lenticular image). Such lamination typically required the application of an adhesive layer (i.e., to the lens sheet, to the substrate layer, or both). The adhesive, unfortunately, can deleteriously affect the optical properties of the image when viewed through the lens. In addition, lamination, of course, requires the extra, and often costly step of joining the two layers to one another.

Preferably, the image is printed directly to the flat back surface of the lenticular sheet or film, e.g., as taught in U.S. Pat. No. 5,457,515, the disclosure of which is incorporated here by reference.

Today, lenticular technology is in use on a variety of items, such as: promotional buttons, magnets, coasters, collectibles, display posters, signs, menu boards, postcards and business cards. Lenticular technology is also used in packaging, publishing and labeling applications. Such applications often include areas that contain small fonts and/or fine seraphs having type sizes, on the order of about nine (9) points or less. Warning labels, ingredient labels or listings, and ownership or attribution markings (e.g., "©2001 National Graphics, Inc., All Rights Reserved"), and the like are instances where small type size is common. In addition, bar code labels—comprising lines and spaces between the lines—have also proven difficult to resolve. As used herein, "resolve" means to make visible and distinguish parts of an image, for instance, the image segments of an interlaced image. Issues like these have posed problems for those attempting to use lenticular technology in conjunction with packaging, publishing, labeling and other applications.

As one example, lenticular lenses having ribbed lenticules with widths on the order of about 0.01333 inches (corresponding to a lenticular lens having 75 lenticules per inch or "LPI") to have been used in the printing industry, and in particular, for lithographically printed applications. Lenses having lenticules of such widths are considered to be "coarse" in their resolution and, as such, they typically cannot resolve small print. Rather, resolving small type/font sizes requires a more "fine" lens resolution, namely, lenses having lenticules with widths on the order of about 0.006667 inches, more preferably about 0.005000 inches, and most preferably about 0.003333 inches or less. Such lenses are termed "high resolution" lenses.

A lenticular lens typically has a gauge thickness, (also referred to here as the lens "gauge" or "thickness"). The gauge thickness (one example of which is shown as $g_2$ of FIG. 1A) of a ribbed or hemispherically-profiled lens is typically the thickness as measured from the outermost edge of the curved surface of the lens to the flat back surface of the lens. High resolution lenticular lenses have typically been relatively thick in their gauge, namely, on the order of at least about 10 mils, or even more. Using thicker gauge (i.e., greater than 10 mils) lenses has led to a variety of problems, especially in the packaging, labeling and publishing industries.

Lenticular lenses are typically made of a plastic material, for example, one or more of: polyester, vinyl, polycarbonate, polyvinyl chloride (PVC), polyethylene terephthalate (PET), amorphous polyethylene terephthalate (APET), and the like. As such, the lenses tend to resist manipulation (e.g., bending, twisting, forming, etc.) that can be required for a particular application. Such lenses actually tend to return to their original shape after the tension of manipulation has been released. For example, a curled plastic lenticular sheet, once flattened or straightened, tends to curl when not fixed in place. In other words, many plastics tend to have a "memory", and the thicker the plastic, the greater the memory. Moreover, the greater the memory, the greater the difficulty in manipulating the plastic, for instance, bending the lenticular around a package corner, or around a curved application, such as a cup.

Thicker lenses, since they require more plastic material, are usually more expensive to manufacture. In fact, it has been found that perhaps about one third of the cost of current lenticular printing can be attributed to the cost of the lenticular plastic itself.

To address these issues, thin lenticular lenses (i.e., lenses having a gauge thickness of less than about 10 mils) are desirable.

Thin lenticular lenses having a narrow lenticule width have been produced, but have heretofore been inadequate for use, at least at a commercial level. To date, viewers, when viewing an image through a thin lenticular lens, have experienced image degradation. Image degradation can take a variety of forms, and these include, for example, blurring and/or ghosting of an image. Typically, a viewer will view the lenticular image from a desired or predetermined distance. To achieve the desired affect (i.e., motion and or depth), the viewer when viewing the lenticular image, will change the angle of observation of the image. This can be accomplished the viewer moving from one location to another, by moving the lenticular image itself (e.g., a handheld image on a cup or trading card), or a combination of both. Again, the precursor image (which is joined to the lenticular lens to make the lenticular image) is a composite of two or more component images. As the angle of observation changes for a viewer, typically one or more of the component images is intended to be viewed. The remaining component images are not intended to be viewed at that angle of observation. "Ghosting" occurs when those image (s) that are not intended to be seen by a viewer are in fact seen.

Heretofore, the images that have been viewed through thin lenticular lenses with narrow lenticules have also been out of focus (i.e., not sharply or clearly defined). Such lenses have not sufficiently resolved individual image segments (as is required to properly create the illusion of motion and/or depth), but instead have typically resolved an area larger than one of the image segments, for example, two juxtaposed image segments. As such, with respect to thin lenticular lenses with lenticules having narrow widths, problems associated with image clarity and sharpness, in addition to image degradation, have resulted in a lenticular image that is unsuitable for use, at least at a commercial level.

Accordingly, a lenticular lens that provides for a lenticular image that can be viewed in focus and without degradation is of interest to a variety of industries, such as the packaging, labeling and publishing industries. The lens would preferably solve the aforementioned image quality problems in a cost-effective manner.

SUMMARY

A high definition lenticular lens and a high definition lenticular image are disclosed that solve the aforementioned problems.

In one aspect, disclosed herein is a high definition lenticular lens comprising: a front surface comprising a plurality of lenticules, each of the lenticules having characteristic parameters that comprise a focal length, an arc angle that is greater than about 90 degrees, and a width that is less than about 0.006667 inches, and a substantially flat back surface opposite the front surface; wherein the lens has a gauge thickness that is substantially equal to the focal length.

In another aspect, disclosed herein is a high definition lenticular lens comprising: a front surface having a plurality of lenticules, each of the lenticules having characteristic parameters that include a focal length, an arc angle that is greater than about 90 degrees, and a width that is less than about 0.006667 inches; and a substantially flat back surface opposite the front surface; wherein the lens has a gauge thickness that is substantially equal to the focal length and the gauge thickness is less than about 10 mils.

In another aspect, disclosed herein is a high definition lenticular image comprising: a lenticular lens comprising: a front surface having a plurality of lenticules, each of the lenticules having characteristic parameters that include a focal length, an arc angle that is greater than about 90 degrees, and a width that is less than about 0.006667 inches; a substantially flat back surface opposite the front surface; and an image that is joined to the substantially flat back surface of the lens; wherein the lens has a gauge thickness that is substantially equal to the focal length.

In another aspect, disclosed herein is a high definition lenticular image comprising: a lenticular lens comprising: a front surface having a plurality of lenticules, each of the lenticules having characteristic parameters that include a focal length, an arc angle that is greater than about 90 degrees, and a width that is less than about 0.006667 inches; a substantially flat back surface opposite the front surface; and an image that is joined to the substantially flat back surface of the lens; wherein the lens has a gauge thickness that is substantially equal to the focal length and the gauge thickness is less than about 10 mils.

In yet another aspect, disclosed herein is a high definition lenticular image comprising: a lenticular lens comprising: a front surface having a plurality of lenticules, each of the lenticules having characteristic parameters that include a focal length, an arc angle that is greater than about 90 degrees, and a width that is less than about 0.006667 inches; a substantially flat back surface opposite the front surface; and an image that is printed directly to the flat back surface of the lens; wherein the lens has a gauge thickness that is substantially equal to the focal length.

In still another aspect, disclosed herein is a high definition lenticular image comprising: a lenticular lens comprising: a front surface having a plurality of lenticules, each of the lenticules having characteristic parameters that include a focal length, an arc angle that is greater than about 90 degrees, and a width that is less than about 0.006667 inches; a substantially flat back surface opposite the front surface; and an image that is printed directly to the flat back surface of the lens; wherein the lens has a gauge thickness that is substantially equal to the focal length and the gauge thickness is less than about 10 mils.

In another aspect, disclosed herein is a package comprising: a package substrate; and a high definition lenticular lens comprising: a front surface having a plurality of lenticules, each of the lenticules having characteristic parameters that include a focal length, an arc angle that is greater than about 90 degrees, a width that is less than about 0.006667 inches; and a substantially flat back surface opposite the front surface; wherein the lens has a gauge thickness that is substantially equal to the focal length; and wherein the lens is joined to the package substrate.

In yet another aspect, disclosed herein is a container comprising: a container substrate; and a high definition lenticular lens comprising: a front surface having a plurality of lenticules, each of the lenticules having characteristic parameters that include a focal length, an arc angle that is greater than about 90 degrees, and a width that is less than about 0.006667 inches; and a substantially flat back surface opposite the front surface; wherein the lens has a gauge thickness that is substantially equal to the focal length; and wherein the lens is joined to the container substrate.

In another aspect, disclosed herein is a cup comprising: a cup substrate; and a high definition lenticular lens comprising: a front surface having a plurality of lenticules, each of the lenticules having characteristic parameters that include a focal length, an arc angle that is greater than about 90 degrees, and a width that is less than about 0.006667 inches; and a substantially flat back surface opposite the front surface; wherein the lens has a gauge thickness that is substantially equal to the focal length; and wherein the lens is joined to the cup substrate.

In another aspect, disclosed herein is a label comprising: a label substrate; and a high definition lenticular lens comprising: a front surface having a plurality of lenticules, each of the lenticules having characteristic parameters that include a focal length, an arc angle that is greater than about 90 degrees, and a width that is less than about 0.006667 inches; and a substantially flat back surface opposite the front surface; wherein the lens has a gauge thickness that is substantially equal to the focal length; and wherein the lens is joined to the label substrate.

In still another aspect, disclosed herein is a high definition lenticular image comprising: a lenticular lens comprising: a front surface comprising a plurality of lenticules, each of the lenticules comprising characteristic parameters that comprise a focal length, an arc angle that is greater than about 90 degrees, and a width that is less than about 0.006667 inches; and a substantially flat back surface opposite the front surface; and an image that is printed directly to the flat back surface of the lens, the image comprising at least one of: a photographic image, a bar code image, and a text image, the text comprising a type size of less than about 9 points; wherein the lens has a gauge thickness that is substantially equal to the focal length. Various other embodiments, features, objects and advantages of the present invention will be made apparent from the following detailed description and the drawings.

DETAILED DESCRIPTION OF THE PREFERRED EMBODIMENTS

Described here is an inventive high definition lenticular lens, along with methods for making and using the same. The lens is described in accordance with an application to which the present invention is particularly suited, i.e., producing multidimensional and/or motion imparting images via a high definition lenticular image. One of skill in the art will understand that the lenticular lens described can have other uses and that appropriate modifications can be made to the particular lenticular pattern (e.g. a parabolic lens, a truncated lens, etc.), plastic lenticular material (e.g., PVC, PET, APET, and the like as described above) and other lens parameters (described below) in accordance with the description in order to render a high definition lenticular lens that is suitable for various applications.

Lenticular lenses can be made in a variety of ways, such as casting, embossing and extrusion. In general, these methods for making lenticular lenses are known. In casting, for example, the lens sheet is often a composite sheet comprising a base layer that is typically plastic, in addition a curable resin layer, for instance an ultraviolet (UV) curable resin, from which the lens is formed. U.S. Pat. No. 4,414,316 and U.S. Pat. No. 4,420,502, the disclosures of which are incorporated by reference herein, teach casting methods for lenticular lenses. Embossing methods for lenticular lenses are also known. Lenticular lenses can also be extruded. Extrusion methods for lenticular lenses are well known, as illustrated by U.S. Pat. No. 5,362,351, directed to coextrusion of lenticular lenses in particular. The disclosure of U.S. Pat. No. 5,362,351 is also incorporated herein by reference. Extruded lenticular lenses can be obtained from Goex Corporation, located in Janesville, Wis.

More specifically, in extrusion, an engraved or patterned cylinder imparts a lenticular pattern (i.e., the cylinder pattern is the inverse of the lenticular lens) into molten plastic. Extrusion using an engraved cylinder is well-known to those of skill in the art as evidenced by U.S. Pat. No. 6,074,192, the disclosure of which is incorporated here by reference. A cylinder of the kind suitable for making the inventive high definition lenticular lens described in this application can be obtained from Micro Lens, Inc., of Matthews, N.C.

Of course, while the high definition lenticular lens is described in the context of extrusion production methods, it will be understood that any of the above-mentioned processes (e.g., embossing, casting, etc.) can be used to produce the inventive lenticular lens without departing from the scope of the present invention.

Figure 1A:
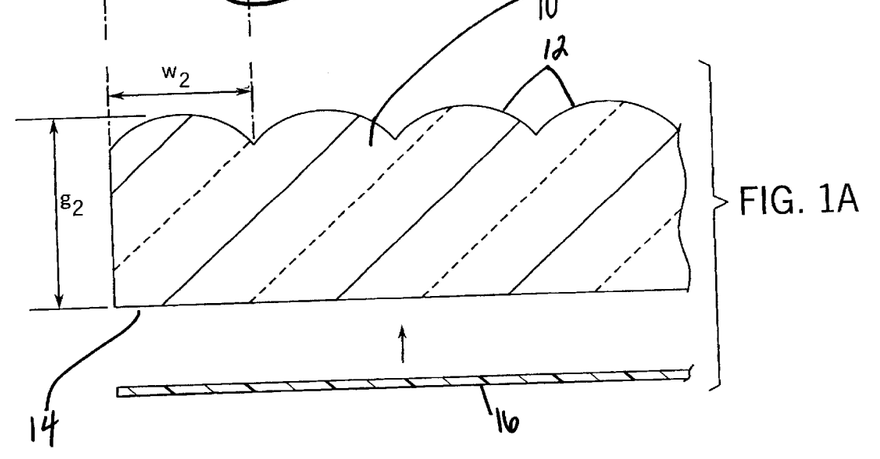
FIG. 1A is an enlarged, schematic cross-sectional view of a high definition lenticular lens portion and a precursor image.

Referring to FIG. 1A, a cross-sectional view of one preferred embodiment of high definition lenticular lens 10 is shown, the lens having one ribbed side comprising a plurality of lenticules 12 (each lenticule identical or substantially identical to another) and substantially flat back side 14. The lens can have image 16 (i.e., an interlaced precursor image that can impart the illusion of motion and/or depth to a viewer viewing the image through the lenticules of the lens) joined directly to it. This can include printing an image directly to the flat back surface. Alternatively, an adhesive (not shown) can be used to join the image to the lens, or the image can be printed to a substrate (e.g., metal, paper, plastic, glass or wood) and the substrate (not shown) subsequently joined to the lenticular lens flat back surface. Other embodiments of lenticular lenses are shown in FIGS. 2A, 3A, 4A, and 5A.

In general, the substrate that is described herein with respect to the present invention can be used to form or make, for example, a package substrate, a container substrate, a cup substrate and a label substrate and each such substrate can be used to form or make a package, a container, a cup or a label, respectively.

Figure 2A:
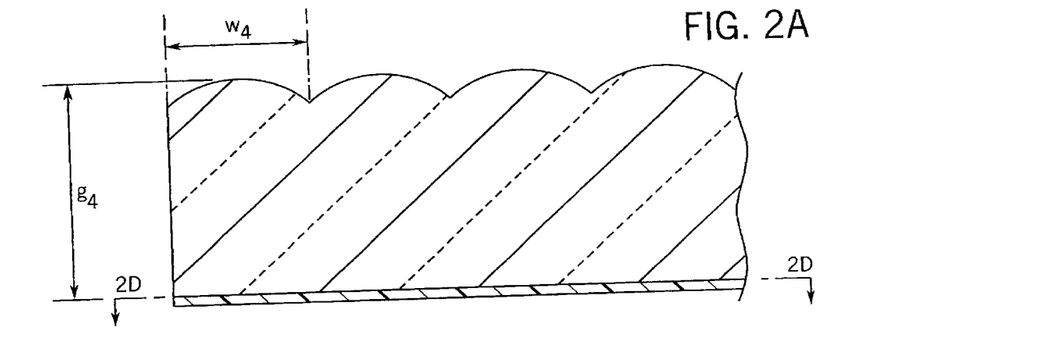
FIG. 2A is an enlarged, schematic cross-sectional view of another high definition lenticular lens portion with an image layer.
Figure 2B:
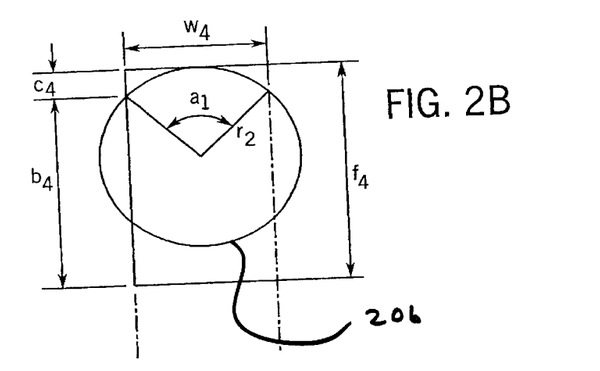
FIG. 2B is a schematic diagram illustrating various parameters used to obtain the high definition lenticular lens of FIG. 2A.
Figure 2C:
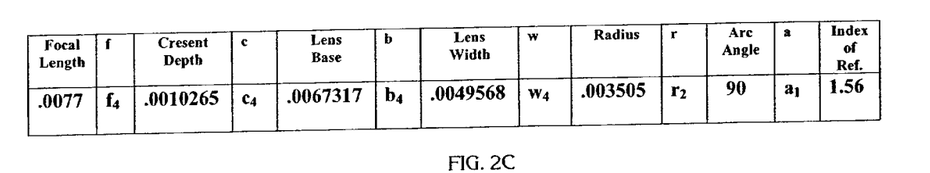
FIG. 2C shows exemplary values for the parameters of the lenticular lens portion of FIG. 2A and the schematic diagram of FIG. 2B.
Figure 2D:
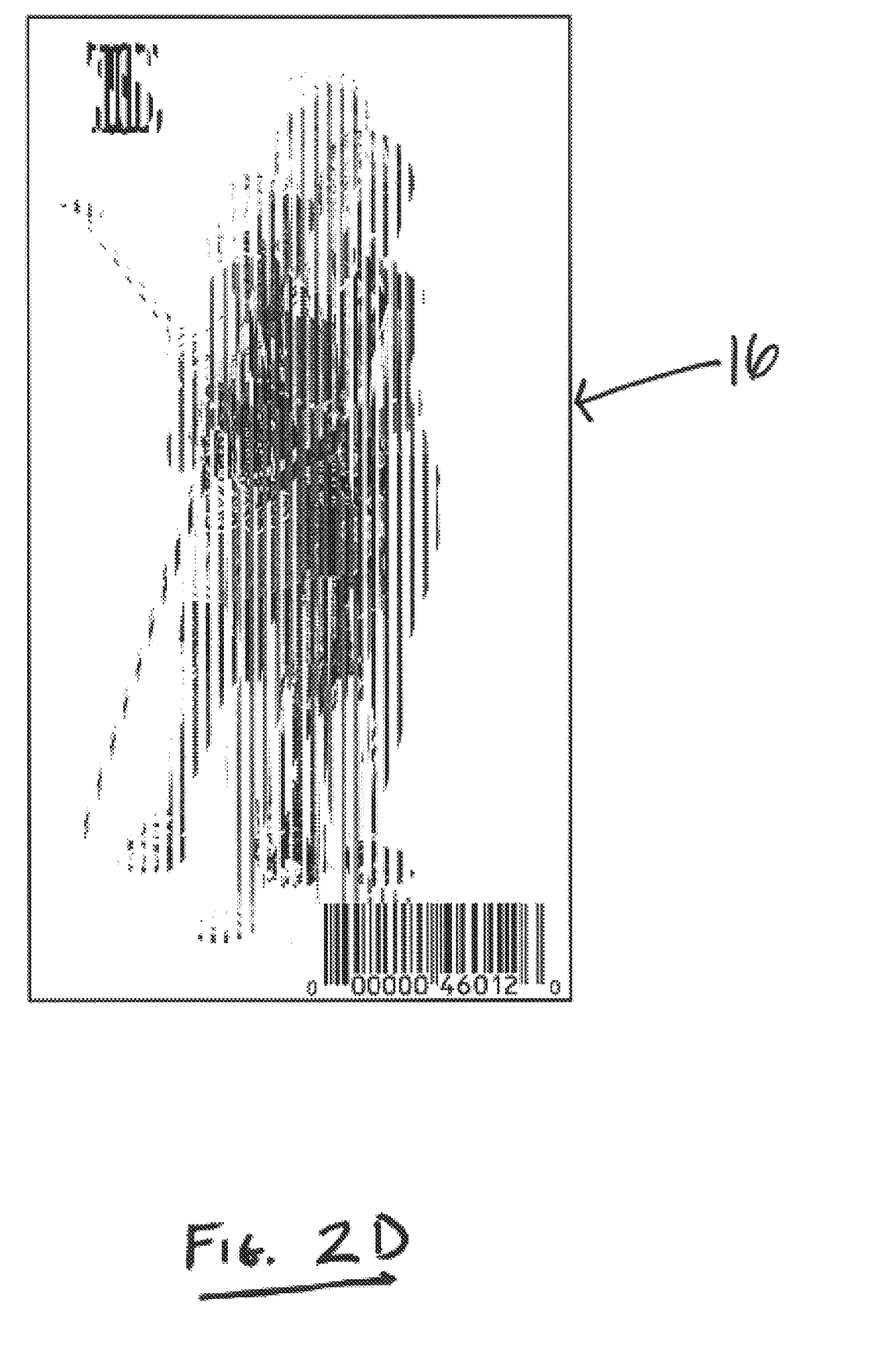
FIG. 2D illustrates one example of a precursor image.
Figure 3A:
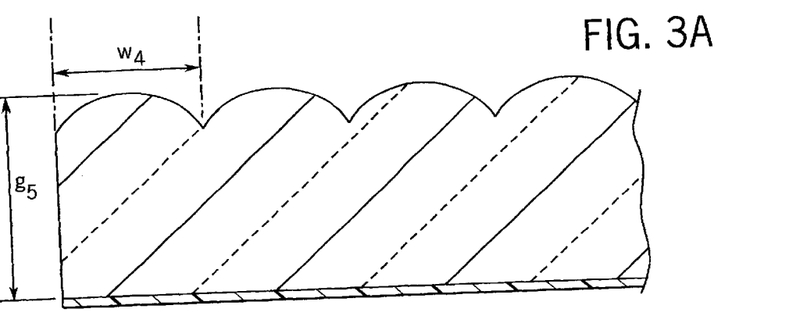
FIG. 3A is an enlarged, schematic cross-sectional view of another high definition lenticular lens portion with an image layer.
Figure 3B:
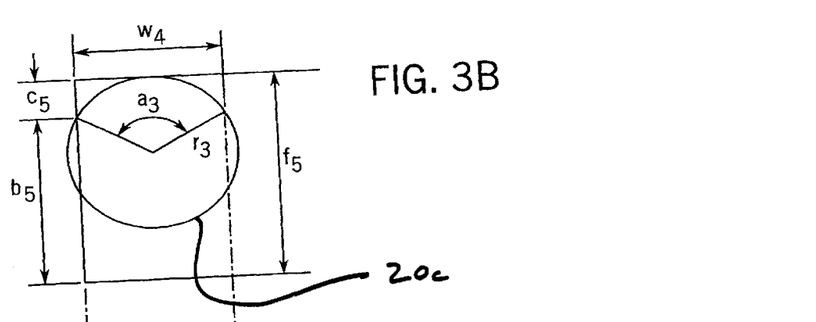
FIG. 3B is a schematic diagram illustrating various parameters used to obtain the high definition lenticular lens of FIG. 3A.
Figure 3C:
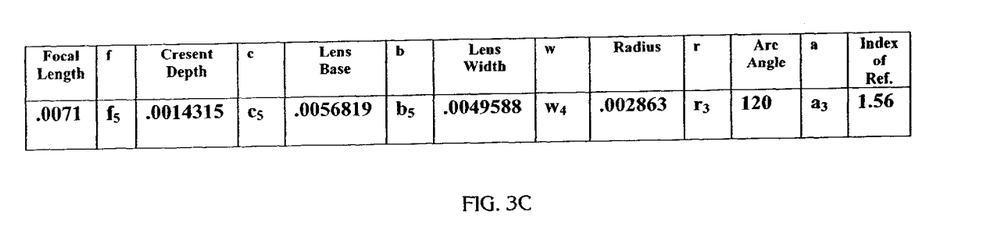
FIG. 3C shows exemplary values for the parameters of the lenticular lens portion of FIG. 3A and the schematic diagram of FIG. 3B.
Figure 4A:
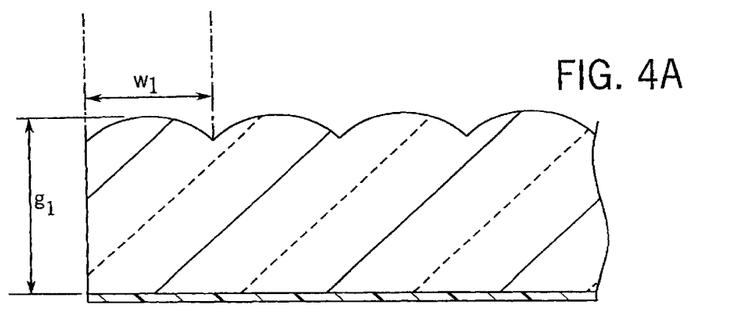
FIG. 4A is an enlarged, schematic cross-sectional view of another high definition lenticular lens portion with an image layer.
Figure 4B:
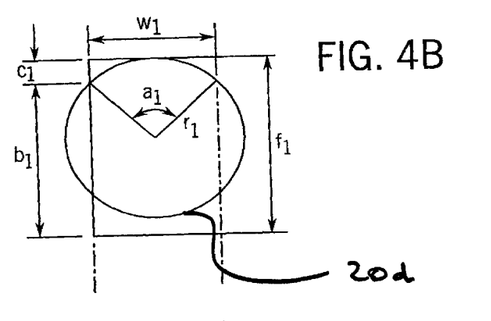
FIG. 4B is a schematic diagram illustrating various parameters used to obtain the high definition lenticular lens of FIG. 4A.
Figure 4C:
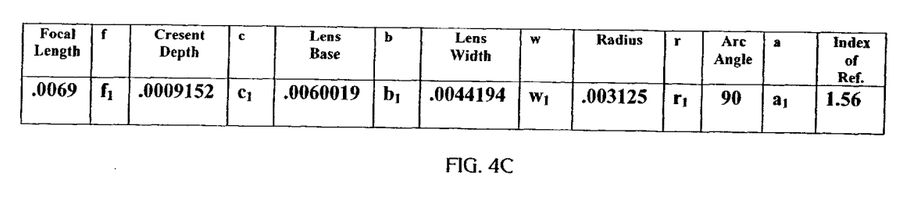
FIG. 4C shows exemplary values for the parameters of the lenticular lens portion of FIG. 4A and the schematic diagram of FIG. 4B.
Figure 5A:
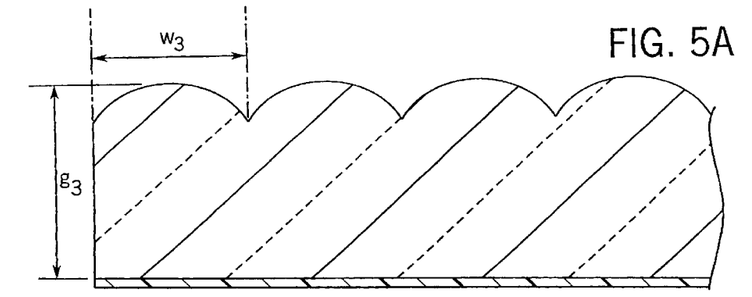
FIG. 5A is an enlarged schematic cross-sectional view of another high definition lenticular lens portion with an image layer.
Figure 5B:
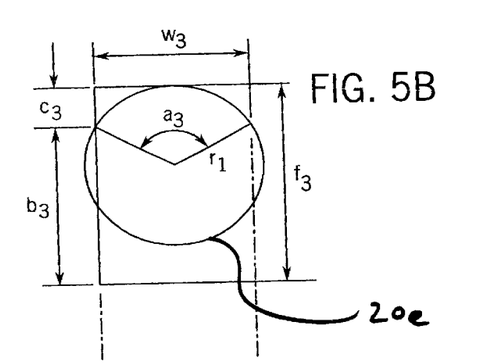
FIG. 5B is an enlarged, schematic diagram illustrating various parameters used to obtain the high definition lenticular lens of FIG. 5A.
Figure 5C:
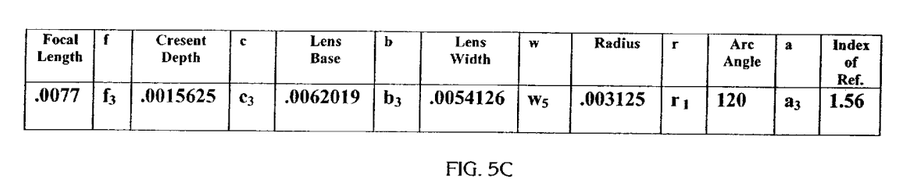
FIG. 5C shows exemplary values for the parameters of the lenticular lens portion of FIG. 5A and the schematic diagram of FIG. 5B.

Turning briefly to FIG. 2D, a precursor image 16 is shown that can be applied to impart the effect of multidimensionality and/or motion. The image is shown to include text (for illustrative purposes, the text shown is larger than 9 points) and a sample bar code. The precursor image includes an interlaced image as well. Specifically, the interlaced image comprises 3 frames. As shown, the image has been interlaced to correspond to a lens that is more coarse than the inventive high definition lens. This has been done for illustrative purposes only. Again, the image can be produced using a variety of methods, described generally above, and which are known to those of skill in the art.

Figure 1B:
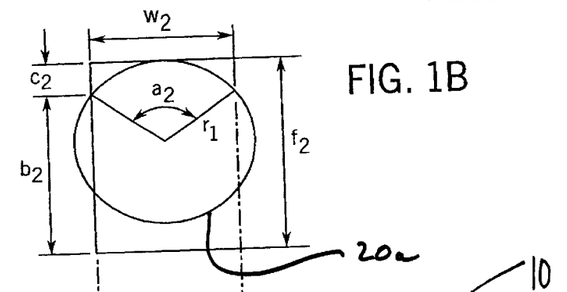
FIG. 1B is a schematic diagram illustrating various parameters that are used to obtain the high definition lenticular lens of FIG. 1.
Figure 1C:
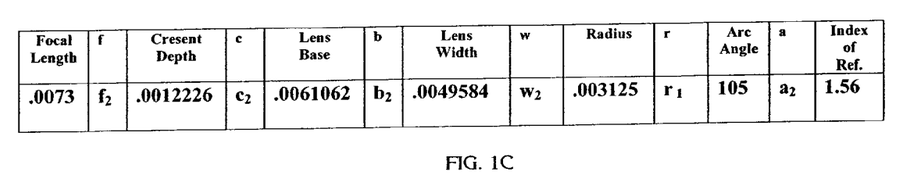
FIG. 1C shows exemplary values for the parameters of the lenticular lens portion of FIG. 1A and the schematic diagram of FIG. 1B.

To obtain the desired high definition lenticular lens using extrusion or other manufacturing processes, it is required that certain aspects of the lens geometry be discovered. Referring to FIG. 1B, a circle 20a is shown. The circle is representative of a simple lens that can be used to approximate one of the plurality of identical or substantially identical lenticules of a lenticular lens, here in particular, the enlarged lenticular lens portion of FIG. 1A. Similar circles 20b, 20c, 20d, and 20e are shown in FIGS. 2A, 3A, 4A, and 5A, respectively.

Various parameters as shown in FIG. 1B, that are used to make the inventive high definition lenticular lens of FIG. 1A are shown in relation to the simple lens. Similarly, FIGS. 2B, 3B, 4B, and 5B illustrate the same various parameters that are used to make the exemplary high definition lenticular lenses shown in FIGS. 2A, 3A, 4A, and 5A, respectively. Generally, these characteristic parameters include: a lenticule radius "r" (measured in thousandths of an inch), arc angle "a" (measured in degrees), lens width "w" (thousandths of an inch), crescent depth "c" (thousandths of an inch), base thickness "b" (thousandths of an inch) and a focal length "f" (thousandths of an inch). Each of the lenticular lenses is typically extruded, or otherwise manufactured, at a characteristic gauge thickness, labeled in FIGS. 1A, 2A, 3A, and 4A as 92, 94, $g_5$, $g_1$, and $g_3$, respectively. As described in this application, the gauge is preferably at or substantially at, the focal length of the lenticules of the lens. The gauge thickness is typically measured in mils. One mil equals one thousandth ($10^{-3}$) of an inch (0.0254 millimeter).

Of course, for every lens, each of these parameters takes on a specific numerical value, and thus, subscripts are attached to indicate these different values. FIGS. 1C, 2C, 3C, 4C and 5C illustrate specific exemplary values for the parameters of the lens portion 1A, 2A, 3A, 4A and 5A, respectively, and the schematic diagram 1B, 2B, 3B, 4B and 5B, respectively. The manner in which these values are calculated (including a specific, but nonlimiting example), is described below.

The lens parameters (e.g., lens radius, arc angle, etc.) are described here in ideal terms, or in other words, in a manner that discounts certain factors that must be considered when creating a lenticular lens. For instance, extrusion of a lenticular lens is a dynamic process that takes place at high temperatures and pressures, temperatures and pressures that can cause "necking", stretching, or other undesirable distortion of the lens. Tension can also cause such stretching, necking and the like. In addition, certain mechanical aspects of manufacturing processes like the extrusion process, for instance—roller alignment—are the subject of periodic (and at times frequent) adjustment. As another example, the engraved chill roller that is used to extrude the lenticular lens must be examined periodically for burrs or other imperfections that might create an unsuitable lens. Such corrections, adjustments, modifications and the like are known and can be made by those of skill in the art.

Also, each of the aforementioned plastic types (e.g., PVC, PET, APET, etc.) passes light through it differently. The index of refraction is a ratio of the speed of light in a vacuum to the speed of light in a given medium (e.g., the material of the lens), and its numerical value can vary depending on, for instance, a material's chemical composition and method of manufacture. More specifically, plastics of the kind typically used to create the high definition lens described here have an index of refraction of about, for instance, 1.3 to about 1.8. A thermoplastic, for example, can have an index of refraction of about 1.56.

Methods for making lenticular lenses preferably account for other imperfections or variations in the lens that can be caused, for instance, when the tool pattern is impressed to create the lens. These factors include: whether the plastic is too hot or too cold as it comes through the nip roller and humidity. Also, raw materials typically vary in their physical make-up, among other things, from lot to lot. Each of these factors can also affect the thickness and optical properties of the plastic that is produced. Thus, for a given production run of lenticular lens, determining whether the gauge thickness of the lens is equal or substantially equal to the focal length requires an iterative verification process (described below).

First, the relationships between the various parameters shown in the Figures and described generally above have been determined as follows:

$$w = 2r[\sin(a/2)] \tag{1}$$

$$c = r - \{[\cos(a/2)] * r\} \tag{2}$$

$$b = \sqrt{[r/(n-1)]^2 + [w/2]^2} \tag{3}$$

$$f = c + b \tag{4}$$

Figure 1D:
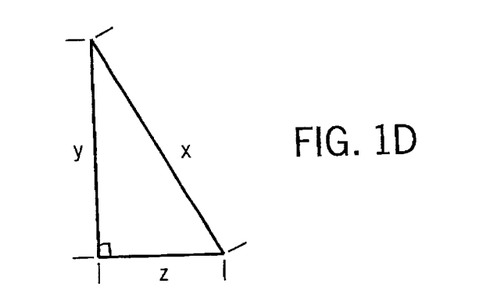
FIG. 1D shows a right triangle illustrating the Pythagorean relationship between the sides of the triangle that can be used in the determination of the high definition lenticular lens parameters.

Thus, lenticule width is a function of both the arc angle and radius of that particular lenticule. The crescent depth is a function of the arc angle and radius of the lenticule. The base length is a function of the arc angle, the lenticule width, and the index of refraction of the particular lenticular raw material type used. The theoretical or desired focal length is obtained by adding the crescent depth to the base length. It has been found that the lens base "b" can be determined using a Pythagoream relationship that can include a right triangle, which includes sides "x", "y", and "z", shown in FIG. 1D. More specifically, it has been found that the lens base "b" can be determined by setting "b" equal to the "x" value in the Pythagorean relationship between the triangle sides, $x^2 = y^2 + z^2$, where it has been further determined that $y = r/(n-1)$ and $z = (w/2)$. Again, "r" represents the lens radius, "w" represents the lens width, and "n" is the index of refraction for a given lens material.

In general, given the above equations, lenticular lens can be manufactured to have a gauge thickness equal or substantially equal to the focal length of one of its lenticules, subject to verification procedure (described below). More specifically, in extrusion, based upon the information that can be obtained from the above equations, an engraved roller of the kind described above can be made, and using the roller a lenticular lens can be extruded.

In an alternative preferred embodiment, an approximation of the focal length of a lenticule (the length equal or substantially equal to the desired gauge thickness of the lens) can be obtained by the amount equal or substantially equal to twice the radius (i.e., 2r) of the lenticule. Of course, this formula discounts certain factors (among them, the particular plastic type) that the more elaborate mathematical relationship for the focal length which is set out above accommodates.

An image is sharpest when placed at a distance equal to the focal length of the lens. Such an image will appear to be "in focus" (i.e., subject to little, if any, distortion and/or degradation) to a viewer viewing the image at a predetermined viewing distance. Again, the predetermined viewing distance is the distance at which a viewer will likely view the lenticular image so as to achieve the desired affect (i.e., multidimensionality and/or motion). This distance can range from a few inches in some applications (e.g., a drinking cup or magazine) to a few feet (e.g., the facade of a soda machine), or even more.

The image is preferably printed directly to the flat back surface of the lens. Accordingly, the lens thickness, or gauge thickness, will preferably be equal to the focal length of the lens so as to achieve a focused image. In contrast, an image printed or otherwise placed at distance that is less or greater than the focal length will appear out of focus.

The inventive lenticular lenses are produced to have a gauge thickness at or substantially at focal length, within a specified tolerance level. For instance, a gauge thickness of 7 mils is produced, for instance, preferably within about ±0.5 mils, more preferably about ±0.25 mils, and most preferably about ±0.1 mils. Significantly, the thinner the gauge, the more critical it is to ensure that the lens is produced within the desired tolerance level. Lenticular lenses can be produced in continuous rolls or as individual sheets of plastic material. A portion of a lenticular roll or a lenticular sheet can easily be separated out during the extrusion process. The lens portion or sheet is then verified for quality and clarity of the lenticular lens, and more particularly, it is examined to determine whether the lens is being produced at a gauge thickness substantially equal to focal length.

Figure 6:
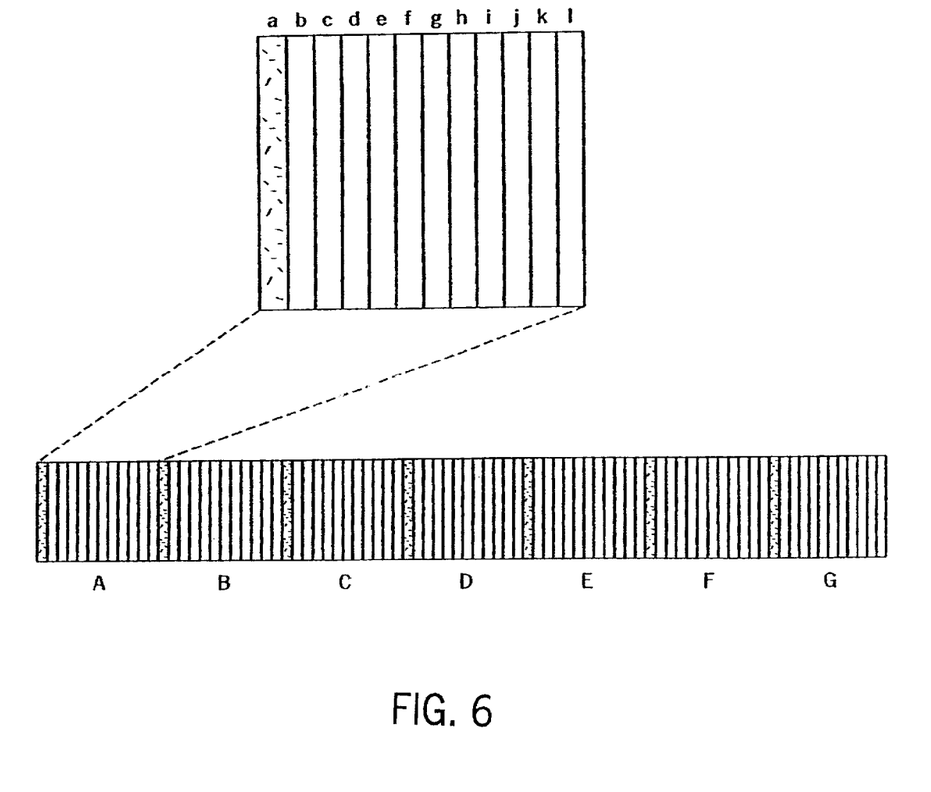
FIG. 6 is an enlarged illustration of a simple pattern that can be used to verify whether the gauge thickness of the lenticular lens is equal or substantially equal to the focal length.

As shown in FIG. 6, a simple pattern can be used in the verification procedure. The simple pattern of the kind used here is preferably a series of identical segments A, B, C, etc., each segment comprising a series of columns or rows (shown in FIG. 6 as columns) a, b, c, etc., which are segments of a series or set of frames. Typically, one such column of each segment is opaque (shown in dashed format) and the remaining columns are white. The position of the opaque column of each interlaced segment is the same, e.g., the opaque column is the "a" column of each interlaced segment. The columns within an interlaced segment are typically of equal width, and typically the number of columns are the same from interlaced segment to interlaced segment. By way of example, for a segment comprising 12 frames, the opaque column width would be $\frac{1}{12}^{th}$ of the width of the segment, the width of the segment corresponding to the width of a single lenticule. In fact, certain advantages (e.g., improved image quality) can be achieved by verifying that the focus of the lens is to a width (i.e., the simple pattern column width) that is substantially equal to or less than the minimum column width of the interlaced image.

Simple patterns of the appropriate resolution, such as the one shown in FIG. 6, can be created through the use of various commercially available software programs such as Adobe™ Photoshop™, manufactured by Adobe Systems Inc. of San Jose, Calif.

An image (such as the one shown in FIG. 2D), or a simple pattern (such as the one shown in FIG. 6 below) can also be used in the verification procedure. The pattern provides an inexpensive solution for achieving the desired goal of verifying whether or not the gauge thickness of the lens being manufactured is in fact equal or substantially equal to the focal length of the lenticules of the lens. The image, on the other hand, provides for verification to take place such that the end product (i.e., the lenticular image imparting the desired motion and/or multidimensional effect) can be examined.

Lenticular lenses are typically extruded as sheets at varying gauge thicknesses, and more specifically, at gauge thicknesses ranging from greater than to less than the theoretical focal length of the lenticules. Using the simple pattern (and/or the interlaced image) clarity and sharpness of the pattern (and/or image) as seen through the lens, as well as the light intensity passing through the lenticular lens can be examined.

To verify that the gauge thickness of a given lenticular lens is at or substantially at its focal length, the lens can be placed on a standard flat light table of the kind that can provide light of constant light intensity. The lenticular lens portions or sheets that are produced at varying gauge thicknesses are then laid over the simple pattern. Positioning the pattern in this way simulates the how an image is positioned when printed to the flat back surface of the lens (as is preferred), or alternatively, the image is first printed to a substrate and subsequently the substrate and image are joined to lenticular lens.

The appropriate gauge thickness of the lens is preferably determined by selecting the lens that properly focuses on the simple pattern and/or the interlaced precursor image. Proper image focus exists when the light passing through the pattern (or image) and lens is most intense and when the clarity and sharpness of the pattern (or image) is greatest. If an image (rather than a simple pattern) used, for a viewer viewing the image through the lens with both the image and lens on top of the light table, the image is "in focus" when each frame "clicks off" crisply from frame to frame. In other words, there is little, if any, degradation (e.g., blurring or ghosting) of the image. Once verification is complete, a full production run of a high definition lenticular lens material can take place.

Certain relationships become apparent in view of the description provided above and such relationships are described in the context of FIGS. 1–5. First, when the lenticule radius is held constant from one lenticular lens to another, but the arc angle varies, the width of a lenticule varies. For example, comparing FIGS. 4A–4B with FIGS. 1A–1B, for a constant radius $r_1$, a wider arc angle ($a_2$ is greater than $a_1$) results in a larger lenticule width (i.e., a more coarse lenticular lens). Put another way, a narrower arc angle will result in a narrower lenticule width (i.e., a more fine lenticular lens). This effect can be seen in more pronounced fashion with respect to the lenticule parameters and enlarged lens portion of FIGS. 5A–5B, since $a_3$ is wider than $a_2$ (of FIGS. 1A–1B).

Additionally, for a constant arc angle, a larger lenticule radius will result in thicker lens gauge when the gauge thickness is at or substantially at the focal length of the lenticules of the lens. This effect can be seen by comparing the lenticule parameters and enlarged lens portion of FIGS. 2A–2B, respectively, with the parameters and lens portion shown in FIGS. 4A–4B. In each case, the arc angle is $a_1$. However, $r_2$ is greater than $r_1$, and as such, the gauge thickness g4 of the lens in FIG. 2A is greater than the gauge thickness $g_1$ of the lens in FIG. 4A.

Figure 7A:
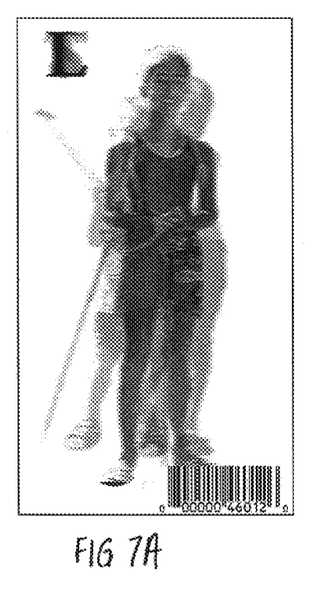
FIGS. 7A–C represents image degradation of three component images when the images are viewed through a lenticular lens having a gauge thickness that is not equal to the focal length.
Figure 7B:
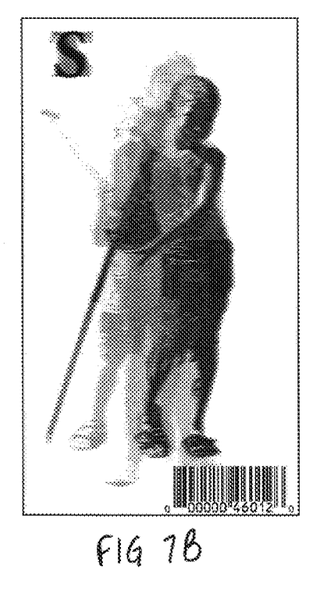
Figure 7C:
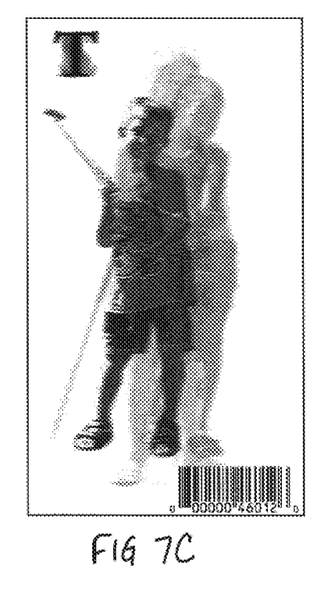

Referring to FIGS. 7A–C, images (including text, photographs and a bar code) that can be used to create a three-frame "flip" lenticular image effect are shown as they can appear when viewed through a lenticular lens having a gauge thickness that is not substantially equal to the lenticule focal length. In a working flip lenticular image, each image should appear crisply as a viewer's viewing angle shifts. In other words, only a single image should be seen at any given time. Here, degradation of the image is apparent. Specifically, ghosting of the images is present in that, for example, with respect to the photographic images, all of the images can be viewed in each of the frames. Also, the images are out of focus, as is indicated by their lack sharpness.

Figure 8A:
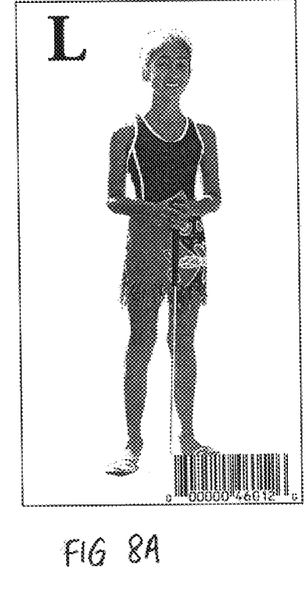
FIGS. 8A–C represents three component images when they are viewed through a lenticular lens having a gauge thickness that is equal to the focal length.
Figure 8B:
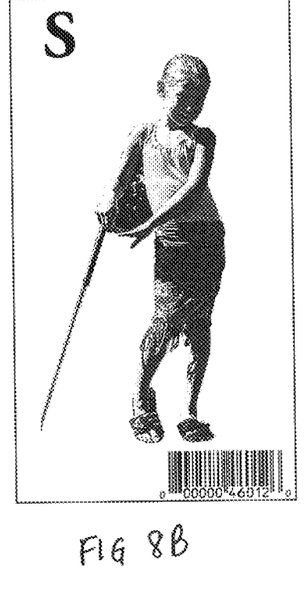
Figure 8C:
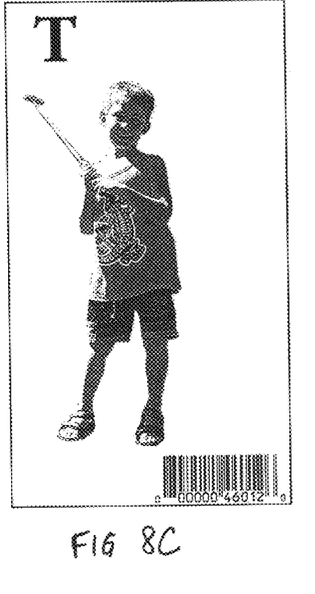

Next, referring to FIGS. 8A–C, the images are represented as they will appear when viewed through a lenticular lens having a gauge thickness that is equal or substantially equal to the lenticule focal length. Minimal, if any, degradation of the images is apparent. The images are in focus.

The finished high definition lenticular lens can be used in a wide variety of applications, only a few of which are mentioned here by way of example only. Other applications will be apparent to one of skill in the art.

The high definition lenticular lens product can be used on packages (e.g., cereal boxes, drug containers, and other products which can be displayed to purchasers, for instance, on store shelves). Generally, such packaging can be rectangular or rounded, or it can any number of different shapes. Examples of packaging for which the high definition lens is particularly suitable are folding cartons and box packaging.

Labeling is another suitable application for using the high definition lenticular lens. Again, the precursor image (i.e., the interlaced image that can ultimately impart the illusion of motion and/or depth once) is joined to the high definition lenticular lens using one of many existing printing methods so as to create the high definition lenticular image(s). Suitable printing methods include, but are not limited to: web offset, flexographic, gravure, stochastic, or electronic deposition (e.g., laser printing, videojet, ink jet, etc.). Electronic deposition is wellsuited for high speed labeling, color productions and the like. Once the image is joined to the lens, labels can be produced using known techniques, for example, using roll labeling and sheet fed labeling techniques.

After joining the image to the high definition lenticular lens, an aqueous or opaque coating (also called a "flood coating") is typically applied so as to cover the image. The opaque coating is sufficiently dense to permit printing thereon (the coating and printing are not shown) without the printing on the coating visible to a viewer viewing the image from the lenticular side of the lens. Specifically, a white or substantially reflective flood coating is typically used to cover the image. The flood coating can be an aqueous (i.e., water-based) coating. The aqueous coating can be opaque or clear. In one preferred embodiment, the flood coating is white and aqueous. Yet another alternative is that a carrier or substrate can be created for the image that is itself white, the carrier comprising, for example paper, plastic, glass or wood.

Applications for the high definition lenticular lens exist in publishing, the automotive industry, and in point-of-sale promotional materials, to name a few. With respect to publishing, the high definition lenticular lens can be used in textbooks, for instance, medical textbooks. The lens can also be used in magazines, and is particularly suited for magazine and other like literary covers. Additionally, the high definition lens is suitable for use in the automotive industry, for example, on automobile dashboards. Finally, the high definition lenticular lens can have applications in point-of-sale (e.g., desk top posters, wall posters, shelf talkers, labels, etc.) and sales promotional (e.g., gift cards, trading or collectible cards, mouse pads, etc.) items and materials.

Thus, a "high definition lens", as used herein, means a lenticular lens that has been manufactured to have a gauge thickness substantially equal to the lens' focal length. The high definition lens is of a high resolution (i.e., having a lenticule width of less than about 0.00667 inches) and arc angle greater than about 90 degrees. Preferably, the high definition less has a thin gauge thickness (i.e., less than about 10 mils). The high definition lenticular lens is capable of receiving a precursor image such that the precursor image is in focus. The precursor image is typically an interlaced image and can, for instance, be printed directly to the flat back surface of the lens. Alternatively, the precursor image can be printed to a suitable substrate material such as paper, plastic, metal, glass or wood and then laminated to the flat back surface of the lens using, for instance, an adhesive. As described above, a high definition lenticular lens having a precursor image joined thereto is termed a "high definition lenticular image".

EXAMPLE

To design a particular high definition lens, certain of the lens parameters are typically set or predetermined (such as radius, arc length, or index of refraction). For example, it may be desirable to make a high definition lenticular lens having approximately 200 lines per inch (or a lens width of about 0.00495 inches). Additionally, another such parameter, index of refraction, may be predetermined by the type of raw material used to make a lenticular lens. Therefore, if desired, one can pick a particular lenticular material type, for example, a thermoplastic. As described above, each material has an index of refraction. One exemplary thermoplastic index of refraction 1.56. Next, a particular manufacturing process is determined, for example extrusion, casting, embossing, and the like.

In lenticular manufacturing, as noted above, a tool having a radius is used to impart the lenticular or ribbed pattern to form the lenticular lens. As a practical matter, the tool radius equals or substantially equals the radius of each lenticule of the lenticular lens. As such, a tool radius can be specified or determined by a designer. Once determined, the desired lenticule radius is determined (or substantially determined). For this example, a tool radius is determined to be about 0.003125 inches). A desired arc angle can also be determined by a designer. In this example, a desired arc angle of 105 degrees can be selected. In general, the arc angle is typically selected based upon a variety of factors, including, for example, the number of frames in the interlaced image, the number of component images, and the desired effect (e.g., multidimensionality and/or motion). Therefore, the index of refraction, lenticule radius and arc angle are set.

Once the lens material's index of refraction (i.e., for this example, 1.56 is used), lenticule radius (about 0.003125 inches), and arc angle (about 105 degrees) are determined, the remaining lens parameters (e.g., focal length, lens base, etc.) can be determined using equations (1)–(4) above. The crescent depth is determined to be about 0.001223 inches, the lens base is determined to be about 6.106 mils and the lenticule focal length is determined to be about 0.007300 inches. With these parameters determined, a high definition lens (and enlarged illustration of which is shown in FIG. 1A) can be made (in this example, extruded). Verification that the high definition lenticular lens with the new design parameters is being manufactured at or substantially at the focal length, and as set forth in detail above can be conducted as well.

Alternatively, instead of specifying the index of refraction, tool radius and arc angle, a designer can choose to specify a desired gauge thickness (and thus the focal length since the gauge thickness will equal or substantially equal the focal length), and a lens width, in addition to a material type (which again determines the index of refraction for the particular material). The selection of specific parameters will yield other parameters for the lenticular lens of interest.

The parameters of the lenticular lens can be varied (for example, throughout a desired range) to convenience to make other lenticular lenses in similar fashion. Again, examples of other high definition lenticular lenses, along with the respective lenticular lens parameters, are shown in the Figures.

The sequence of events or steps of making a high definition lenticular lens as set forth in the above example is provided for illustrative purposes. It is contemplated that any sequence of steps or selection of parameters used with the above identified equations may be used. Other parameter selection sequences are considered to be encompassed by the present invention.

The present invention has been described in terms of preferred embodiments. Equivalents, alternatives, and modifications, aside from those expressly stated herein, are possible and should be understood to be within the scope of the appending claims.

What is claimed is:

1. A high definition lenticular lens comprising:
   a front surface comprising a plurality of lenticules, each of the lenticules having characteristic parameters that comprise a focal length, an arc angle that is greater than about 90 degrees, and a width that is less than about 0.006667 inches; and
   a substantially flat back surface opposite the front surface;
   wherein the lens has a gauge thickness that is substantially equal to the focal length.

2. The high definition lenticular lens of claim 1 wherein the lens gauge thickness is less than about 10 mils.

3. The high definition lenticular lens of claim 1 further comprising an image that is joined to the flat back surface thereby creating a high definition lenticular image.

4. The high definition lenticular lens of claim 3 wherein the image is printed onto the flat back surface of the lens.

5. The high definition lenticular lens of claim 4 wherein the image is printed onto the lens by one of: sheet-fed printing, web-offset printing, flexographic printing, gravure printing, digital printing, and electronic deposition printing.

6. The high definition lenticular lens of claim 4 wherein digital printing comprises one of: laser printing, electrostatic printing, dye sublimation printing, ink jet printing and photographic emulsion.

7. The high definition lenticular lens of claim 3 further including an opaque flood coating over the image, the flood coating being of sufficient density to permit printing thereon.

8. The high definition lenticular lens of claim 7 wherein the flood coating is white.

9. The high definition lenticular lens of claim 3 wherein the flood coating is an aqueous flood coating.

10. The high definition lenticular lens of claim 1 wherein the lens is manufactured of a plastic material selected from the group consisting of: polyester, vinyl, polycarbonate, polyvinyl chloride, polyethylene terephthalate, and amorphous polyethylene terephthalate.

11. The high definition lenticular lens of claim 3 wherein the image comprises a bar code pattern.

12. The high definition lenticular lens of claim 3 wherein the image comprises text, the text at a type size of less than about 9 points.

13. The high definition lenticular lens of claim 1 further comprising a precursor image that is joined to a substrate, the precursor image and substrate subsequently joined to the high definition lenticular lens to form a high definition lenticular image.

14. The high definition lenticular lens of claim 13 wherein the substrate is manufactured from at least one of: paper, plastic, metal, glass or wood.

15. The high definition lenticular lens of claim 13 wherein the image is printed onto the substrate by one of: sheet-fed, web-offset, flexographic, gravure, digital, inkjet, and electronic deposition.

16. The high definition lenticular lens of claim 1 comprising an ultraviolet curable resin.

17. The high definition lenticular lens of claim 1 wherein the lens comprises an ultraviolet curable resin and a plastic material selected from the group consisting of polyester, vinyl, polycarbonate, polyvinyl chloride, polyethylene terephthalate, and amorphous polyethylene terephthalate.

18. The high definition lenticular lens of claim 1 wherein the lens comprises a thermnoplastic material.

19. The high definition lenticular lens of claim 1 wherein the lens comprises a plastic material.

20. The high definition lenticular lens of claim 1 wherein the lens comprises an electron beam curable resin material.

21. The high definition lenticular lens of claim 1 wherein the lens is joined to at least one of: a package, a cup, a container, and a label.

22. The high definition lenticular lens of claim 1 wherein the lens is used to form at least one of: a package, a cup, a container, and a label.

23. A high definition lenticular lens comprising:
   a front surface having a plurality of lenticules, each of the lenticules having characteristic parameters that include a focal length, an arc angle that is greater than about 90 degrees, and a width that is less than about 0.006667 inches; and
   a substantially flat back surface opposite the front surface;
   wherein the lens has a gauge thickness that is substantially equal to the focal length and the gauge thickness is less than about 10 mils.

24. A high definition lenticular image comprising:
a lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface; and
an image that is joined to the substantially flat back surface of the lens;
wherein the lens has a gauge thickness that is substantially equal to the focal length.

25. The high definition lenticular image of claim 24 wherein the image comprises text comprising a type size of less than about 9 points.

26. The high definition lenticular image of claim 24 wherein the image comprises a bar code.

27. A high definition lenticular image comprising:
a lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface; and
an image that is joined to the substantially flat back surface of the lens;
wherein the lens has a gauge thickness that is substantially equal to the focal length and the gauge thickness is less than about 10 mils.

28. A high definition lenticular image comprising:
a lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface; and
an image that is printed directly to the flat back surface of the lens;
wherein the lens has a gauge thickness that is substantially equal to the focal length.

29. A high definition lenticular image comprising:
a lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface; and
  an image that is printed directly to the flat back surface of the lens;
wherein the lens has a gauge thickness that is substantially equal to the focal length and the gauge thickness is less than about 10 mils.

30. A package comprising:
a package substrate; and
a high definition lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface;
wherein the lens has a gauge thickness that is substantially equal to the focal length; and
wherein the lens is joined to the package substrate.

31. The package of claim 30 further comprising an image that is joined to the base of the lens.

32. The package of claim 31 wherein the image comprises text comprising a type size of less than about 9 points.

33. The package of claim 31 wherein the image comprises a bar code.

34. A container comprising:
a container substrate; and
a high definition lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface;
wherein the lens has a gauge thickness that is substantially equal to the focal length; and
wherein the lens is joined to the container substrate.

35. The container of claim 34 comprising an image that is joined to the base of the lens.

36. The container of claim 35 wherein the image comprises text comprising a type size of less than about 9 points.

37. The container of claim 35 wherein the image comprises a bar code.

38. A cup comprising:
a cup substrate; and
a high definition lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface;
wherein the lens has a gauge thickness that is substantially equal to the focal length; and
wherein the lens is joined to the cup substrate.

39. The cup of claim 38 comprising an image that is joined to the base of the lens.

40. The cup of claim 39 wherein the image comprises text comprising a type size of less than about 9 points.

41. The cup of claim 39 wherein the image comprises a bar code.

42. A label comprising:
a label substrate; and
a high definition lenticular lens comprising:
  a front surface having a plurality of lenticules, each of the lenticules having characteristic parameters that include a focal length, an arc angle that is greater than about 90 degrees, and a width that is less than about 0.006667 inches; and
  a substantially flat back surface opposite the front surface;
wherein the lens has a gauge thickness that is substantially equal to the focal length; and
wherein the lens is joined to the label substrate.

43. The label of claim 42 comprising an image that is joined to the base of the lens.

44. The label of claim 43 wherein the image comprises printed text comprising a type size of less than about 9 points.

45. The label of claim 43 wherein the image comprises a bar code.

46. A high definition lenticular image comprising:
- a lenticular lens comprising:
  - a front surface comprising a plurality of lenticules, each of the lenticules comprising
    - characteristic parameters that comprise a focal length, an arc angle that is greater than about 90 degrees, and a width that is less than about 0.006667 inches; and
  - a substantially flat back surface opposite the front surface; and
- an image that is printed directly to the flat back surface of the lens, the image comprising at least one of: a photographic image, a bar code image, and a text image, the text comprising a type size of less than about 9 points;
- wherein the lens has a gauge thickness that is substantially equal to the focal length.

* * * * *

UNITED STATES PATENT AND TRADEMARK OFFICE
CERTIFICATE OF CORRECTION

PATENT NO.    : 6,424,467 B1
DATED         : July 23, 2002
INVENTOR(S)   : Timothy P. Goggins It is certified that error appears in the above-identified patent and that said Letters Patent is hereby corrected as shown below:

Title page,
Item [56], References Cited, U.S. PATENT DOCUMENTS, add the following references:
-- 4,541,727 A   09/1985   Rosenthal      368/232
   5,838,494 A   11/1998   Araki          359/455
   6,226,907 B1  05/2001   Conley et al.   40/454
   6,256,150 B1  07/2001   Rosenthal      359/619 --

Column 7,
Line 66, replace "92, 94," with -- $g_2$, $g_4$, --.

Column 14,
Line 47, replace "thermnoplastic" with -- thermoplastic --.

Signed and Sealed this

Twentieth Day of April, 2004

JON W. DUDAS
*Acting Director of the United States Patent and Trademark Office*